(12) United States Patent
Tocker et al.

(10) Patent No.: US 10,862,738 B2
(45) Date of Patent: Dec. 8, 2020

(54) SYSTEM AND METHOD FOR ALARM CORRELATION AND ROOT CAUSE DETERMINATION

(71) Applicant: TEOCO CORPORATION, Fairfax, VA (US)

(72) Inventors: Moshe Tocker, Tel Aviv (IL); Itai Lavi, Modiin (IL)

(73) Assignee: TEOCO CORPORATION, Fairfax, VA (US)

( * ) Notice: Subject to any disclaimer, the term of this patent is extended or adjusted under 35 U.S.C. 154(b) by 0 days.

(21) Appl. No.: 15/841,226

(22) Filed: Dec. 13, 2017

(65) Prior Publication Data

US 2018/0254942 A1 Sep. 6, 2018

Related U.S. Application Data

(60) Provisional application No. 62/465,205, filed on Mar. 1, 2017.

(51) Int. Cl.
*G06F 15/16* (2006.01)
*H04L 12/24* (2006.01)

(52) U.S. Cl.
CPC .......... *H04L 41/064* (2013.01); *H04L 41/065* (2013.01)

(58) Field of Classification Search
CPC ...... H04L 41/0631; H04L 41/64; H04L 41/65
See application file for complete search history.

(56) References Cited

U.S. PATENT DOCUMENTS

| 7,535,349 B2 | 5/2009 | Shneyder et al. |
| 7,646,294 B2 | 1/2010 | Kow et al. |
| 7,889,666 B1 * | 2/2011 | Pei .......... H04L 41/065 370/242 |
| 9,294,631 B1 * | 3/2016 | Cogan .......... H04M 15/70 |
| 9,497,072 B2 | 11/2016 | Gates et al. |
| 2002/0111755 A1 * | 8/2002 | Valadarsky .......... H04L 41/065 702/58 |
| 2003/0110007 A1 * | 6/2003 | McGee .......... G06F 11/0709 702/179 |
| 2005/0080806 A1 * | 4/2005 | Doganata .......... G06F 11/0709 |
| 2009/0049338 A1 * | 2/2009 | Unnikrishnan .... G05B 23/0281 714/26 |

(Continued)

*Primary Examiner* — Hieu T Hoang
(74) *Attorney, Agent, or Firm* — David, Brody & Dondershine, LLP; Ralph P. Albrecht

(57) ABSTRACT

A Fault Management (FaM) system monitoring a telecommunication network is able to determine a root cause of a malfunction within the network. The root cause determination is accomplished by receiving alarms from network elements, which may be physical devices, logical interfaces, or a combination thereof. An alarm typically includes a managed object, an alarm name, object type, timestamp, and the like. FaM systems may receive thousands of alarms, where a root cause alarm indicates a malfunction which triggered other alarms to be reported. Alarms are correlated by the FaM system, and a probability is determined for each correlated alarm to be the root cause. The system may have a learning mode, in which it correlates alarms, and an online mode, in which it receives alarms and determines that the alarms are correlated based on data from the learning mode. In some embodiments, both modes may be executed in parallel.

20 Claims, 5 Drawing Sheets

(56) References Cited

U.S. PATENT DOCUMENTS

| | | | |
|---|---|---|---|
| 2012/0290716 A1* | 11/2012 | Ogielski | H04L 45/12 709/224 |
| 2013/0212257 A1* | 8/2013 | Murase | H04L 41/0631 709/224 |
| 2014/0043983 A1* | 2/2014 | Huang | H04L 41/0677 370/244 |
| 2014/0108324 A1* | 4/2014 | Chen | G06F 17/18 706/52 |
| 2015/0235141 A1* | 8/2015 | Rensing | G05B 23/0278 706/52 |
| 2015/0254969 A1* | 9/2015 | Bishop | H04L 41/0618 340/506 |
| 2016/0179598 A1* | 6/2016 | Lvin | G06F 11/079 714/48 |
| 2016/0328954 A1* | 11/2016 | Ramadoss | G05B 19/0428 |
| 2017/0031565 A1* | 2/2017 | Chauhan | G06F 3/04847 |
| 2017/0147418 A1* | 5/2017 | Sasturkar | G06F 11/079 |
| 2017/0235623 A1* | 8/2017 | Brew | H04L 41/064 714/37 |
| 2017/0294112 A1* | 10/2017 | Kushnir | G08B 29/02 |

* cited by examiner

SYSTEM AND METHOD FOR ALARM CORRELATION AND ROOT CAUSE DETERMINATION

CROSS-REFERENCE TO RELATED APPLICATION

The disclosure claims the benefit under 35 U.S.C. § 1.119(e) of US Provisional Patent Application Ser. No. 62/465,205 filed on Mar. 1, 2017, entitled "System and Method for Alarm Correlation and Root Cause Determination," to Tocker et al., the contents of all of which is incorporated herein by reference in its entirety.

TECHNICAL FIELD

The disclosure generally relates to fault management systems and particularly to alarm processing in fault management systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Telecommunication networks have many layers of complexities. For example, when monitoring a network, one must take into account that certain functionalities may be performed by different types of equipment, or components, which may in turn require different methods of monitoring. A router, for example, can perform the same functionality of routing data packets, and the network may include a plurality of routers each from a different manufacturer. A fault management system typically handles alarms generated by such network components, to allow users of the system to monitor the status of the network and address any problems the network experiences. However, the task of receiving meaningful insight from the alarms received may be daunting, as many alarms are received and often need to be sorted manually. It would therefore be advantageous to provide a system which could address deficiencies in conventional solutions.

SUMMARY

According to an exemplary embodiment, a computerized method for configuring a fault management (FaM) system coupled with a telecommunication network, for detecting malfunctions in the telecommunication network, the method can include: receiving, by at least one processor, over the telecommunication network a plurality of alarms, each alarm comprising: a network element (NE) identifier of an NE of the telecommunication network, an alarm name, and a timestamp; generating, by the at least one processor, a plurality of temporal clusters, each temporal cluster associated with one or more alarms of the plurality of alarms; determining, by the at least one processor, a first probability that a first alarm of a first temporal cluster, and a second alarm of the first temporal cluster, are correlated; and determining, by the at least one processor, a causality between the first alarm and the second alarm, upon determination that the first probability exceeds a first threshold.

According to one exemplary embodiment, the method can include where each temporal cluster is of an equal length of time.

According to one exemplary embodiment, the method can include where determining the first probability can further include: determining, by the at least one processor, a second probability: of the alarm type of the first alarm to occur; and determining, by the at least one processor, a third probability: of the alarm type of the second alarm to occur.

According to one exemplary embodiment, the method can further include determining, by the at least one processor, a number of times the first alarm type and the second alarm type occur together.

According to one exemplary embodiment, the method can include where determining the causality can further include: determining, by the at least one processor, a probability that the first alarm is a parent of the second alarm.

According to one exemplary embodiment, the method can include where the number of occurrences of the first alarm type exceed the number of occurrences of the second alarm type.

According to one exemplary embodiment, the method can further include where displaying, by the at least one processor, only the parent alarm to a user of the FaM System.

According to one exemplary embodiment, the method can further include displaying, by the at least one processor, one or more child alarms associated with the parent alarm, upon receiving an instruction from a user device of the FaM System.

According to one exemplary embodiment, the method can include where an NE is at least one of: a physical component, a logical component, or a combination thereof.

According to one exemplary embodiment, the method can include where associating an alarm with a temporal cluster is performed respective of, or related to, the alarm timestamp.

According to one exemplary embodiment, the method can include where the NE identifier is associated with a managed object.

According to yet another exemplary embodiment, a system can include where a fault management FaM system coupled with a telecommunication network, said fault management FaM system can be configured to: detect malfunctions in the telecommunication network comprising wherein said fault management FaM system is configured to: receive over the telecommunication network a plurality of alarms, each alarm comprising: a network element (NE) identifier of an NE of the telecommunication network, an alarm name, and a timestamp; generate a plurality of temporal clusters, each temporal cluster associated with one or more alarms of the plurality of alarms; determine a first probability that a first alarm of a first temporal cluster, and a second alarm of the first temporal cluster, are correlated; and determine a causality between the first alarm and the second alarm, upon determination that the first probability exceeds a first threshold.

According to another exemplary embodiment, a computer program product, can include where the computer program product embodied on a nontransitory computer accessible storage medium, which when executed on at least one processor performs a method of configuring a fault management FaM system coupled with a telecommunication network, wherein the method can include configuring the fault management FaM system for detecting malfunctions in the telecommunication network, the method comprising:

receiving over the telecommunication network a plurality of alarms, each alarm comprising: a network element (NE) identifier of an NE of the telecommunication network, an alarm name, and a timestamp; generating a plurality of temporal clusters, each temporal cluster associated with one or more alarms of the plurality of alarms; determining a first probability that a first alarm of a first temporal cluster, and a second alarm of the first temporal cluster, are correlated; and determining a causality between the first alarm and the second alarm, upon determination that the first probability exceeds a first threshold.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1:
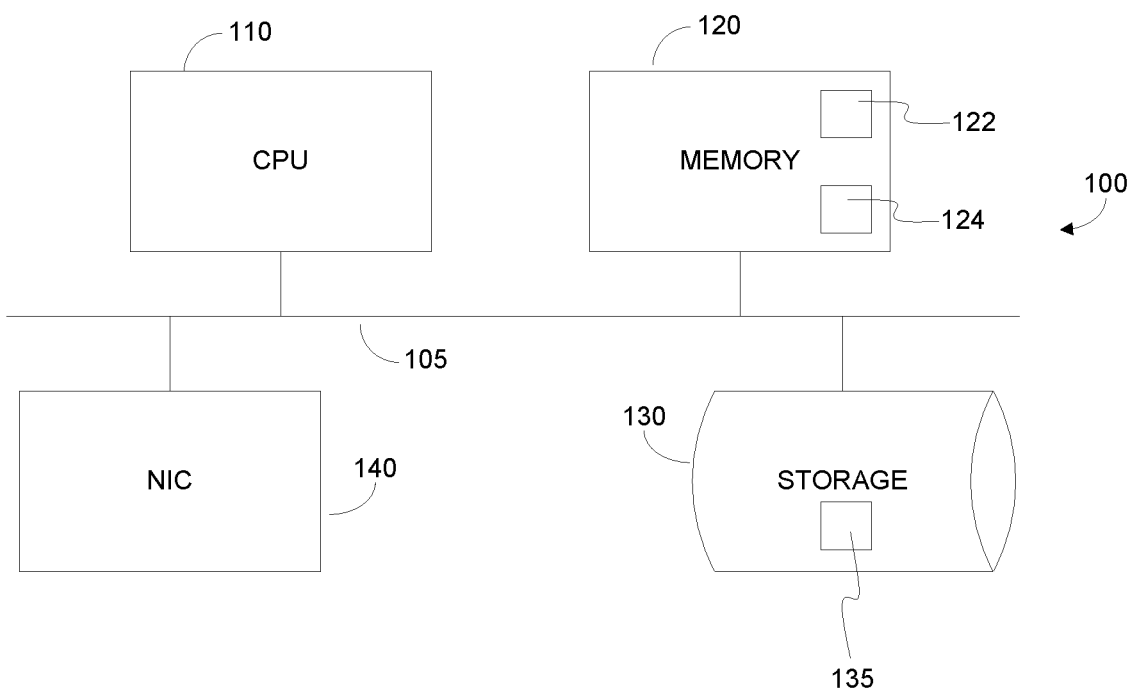
FIG. 1—is a schematic illustration of a fault management (FaM) system implemented according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

A Fault Management (FaM) system, according to one exemplary embodiment, can be used, e.g., but not limited to, monitoring a telecommunication network, which can be able to determine a root cause of a malfunction within the network. An exemplary embodiment of the FaM system can accomplish determining a root cause of malfunction within the network, by receiving alarms from network elements, which may be, e.g., but not limited to, physical devices, logical interfaces, etc., or a combination thereof. An example alarm can typically include a managed object, an alarm name, object type, timestamp, and the like. FaM systems, in an example embodiment, may receive thousands of alarms, where a root cause alarm indicates a malfunction, which may have triggered other alarms to be reported. Alarms are correlated by the FaM system, in one embodiment, and a probability is determined for each correlated alarm to be the root cause. The system may have a learning mode, in one embodiment, in which the system correlates alarms, and an online mode, in which the system receives alarms and determines that the alarms are correlated based on data from the learning mode. In some example embodiments, both the learning and online modes may be executed in parallel.

FIG. 1 is an exemplary and non-limiting schematic illustration of a fault management (FaM) system 100 implemented according to an embodiment. The system 100 can in one embodiment include at least one processing element 110, for example, a central processing unit (CPU). In an embodiment, the processing element 110 may be, or be a component of, a larger processing unit implemented with one or more processors. The one or more processors may be implemented with any combination of general-purpose microprocessors, special purpose processors, microcontrollers, digital signal processors (DSPs), field programmable gate array (FPGAs), programmable logic devices (PLDs), controllers, application specific integrated circuits (ASICs), state machines, gated logic, discrete hardware components, dedicated hardware finite state machines, systems on a chip (SOC), multi-core processors, co-processors, CISC or RISC processors, or any other suitable entities that can perform calculations or other manipulations of information, according to exemplary embodiments. The processing element 110 is coupled via a bus 105 to a memory 120. Various other subsystems including, e.g., but not limited to, other subsystems not shown, can be coupled to the bus 105 including bus master interfaces, storage subsystems, communications interfaces, input/output interfaces, input/output devices, cryptographic subsystems, sensor based devices, touch screens, touch sensitive displays, location and movement sensors, etc. (not shown). The memory 120 may include a memory portion 122 that in exemplary embodiments can contain instructions that when executed by the processing element 110 can perform the method described in more detail herein. The memory 120 may be further used as a working scratch pad for the processing element 110, a temporary storage, and others, as the case may be. The memory 120 may be a volatile memory such as, but not limited to random access memory (RAM), or non-volatile memory (NVM), such as, e.g., but not limited to, Flash memory, Solid state digital (SSD) memory, supplemental storage devices, including for example hard disk drive storage devices, magnetic, optical and/or magneto-optical storage devices, CD-ROM, and digital versatile disk (DVD), etc. (not all shown). Memory 120 may further include memory portion 124 containing a plurality of alarms, clustered in discrete units of time, as discussed in further detail below. The processing element 110 may be further coupled with a storage 130. Storage 130 may be used for the purpose of holding a copy of the method executed in accordance with the disclosed technique. Storage 130 may include storage portion 135 containing alarm clusters. The processing element 110 may be further coupled with a network interface controller (NIC) 140. The NIC 140 can allow the system 100 to connect to a network, as discussed in more detail in FIG. 2 The processing element 110 and/or the memory 120 may also include machine-readable media for storing software. Software shall be construed broadly to mean any type of instructions, whether referred to as software, firmware, middleware, microcode, hardware description language, textual code, 3GL languages, 4GL, and/or object-oriented, batch, and/or otherwise. Instructions may include code (e.g., in source code format, binary code format, executable code format, or any other suitable format of code). The instructions, when executed by the one or more processors, can cause the processing system to perform the various functions described in further detail herein. Software application programs can include, e.g., but not limited to, operating system, device drivers, and/or application programs including, e.g., but not limited to, graphical user interfaces, decision support systems, expert systems, executive information systems, artificial intelligence, and/or machine learning systems, and/or database management systems including flat file data, hierarchical data, relational data, and/or graph databases, etc.

Figure 2:
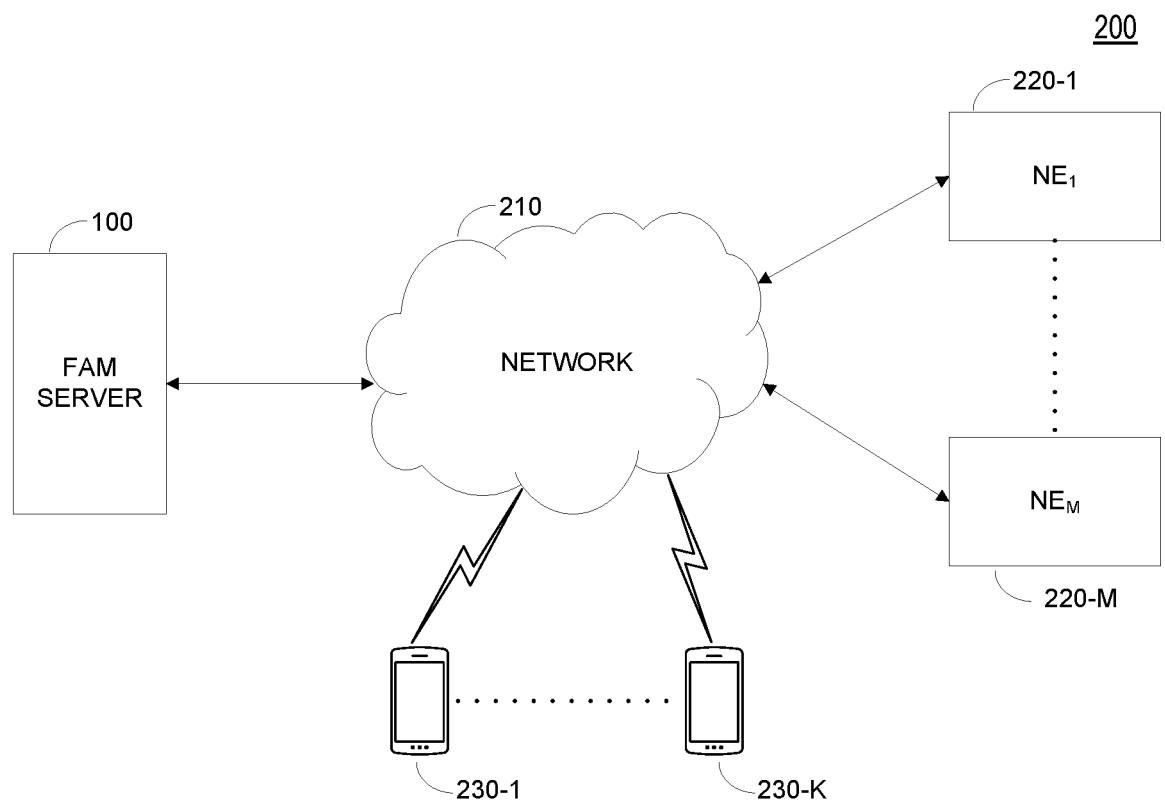
FIG. 2—is a schematic illustration of a telecommunication network, implemented in accordance with an embodiment.

FIG. 2 is a non-limiting exemplary schematic illustration of a telecommunication network, implemented in accordance with an embodiment. A FaM system 100 is coupled via a network 210 to a plurality of network elements 220-1 through 220-M, where 'M' is an integer having a number of '1' or greater. In an embodiment, the network 210 may be configured to provide connectivity of various sorts, as may be necessary, including but not limited to, wired and/or wireless connectivity, including, for example, local area network (LAN), wide area network (WAN), metro area network (MAN), personal area network (PAN), home network, office network, campus wide network, worldwide web (WWW), Internet, and any combination thereof, as well as wired and/or wireless communication networks, and, e.g., cellular connectivity. A network element 220 is an element of a telecommunication network, which in turn can enable connectivity between subscribers 230-1 through 230-K of the network, where 'K' is an integer having a value of '1' or greater. Network elements may include physical elements, such as, e.g., but not limited to, routers, antennas, access points, base stations, mobile switching center (MSC), and the like. Network elements may also include logical elements, such as an X2 interface, S1 interface, and the like. Some components of the network may be represented by both physical network elements (NEs) and logical NEs. Each NE may send various messages across the network, some of which may be alerts, notifications, and/or traps. The FaM system 100 can receive notifications from the NEs 220 to monitor the network and alert users of network conditions as they arise, in an exemplary embodiment. For example, the FaM system 100 may monitor different NEs to determine when a cell tower antenna is down, in one embodiment. The system may generate an example alert to notify that an element or component needs to be repaired in an example embodiment.

Figure 3:
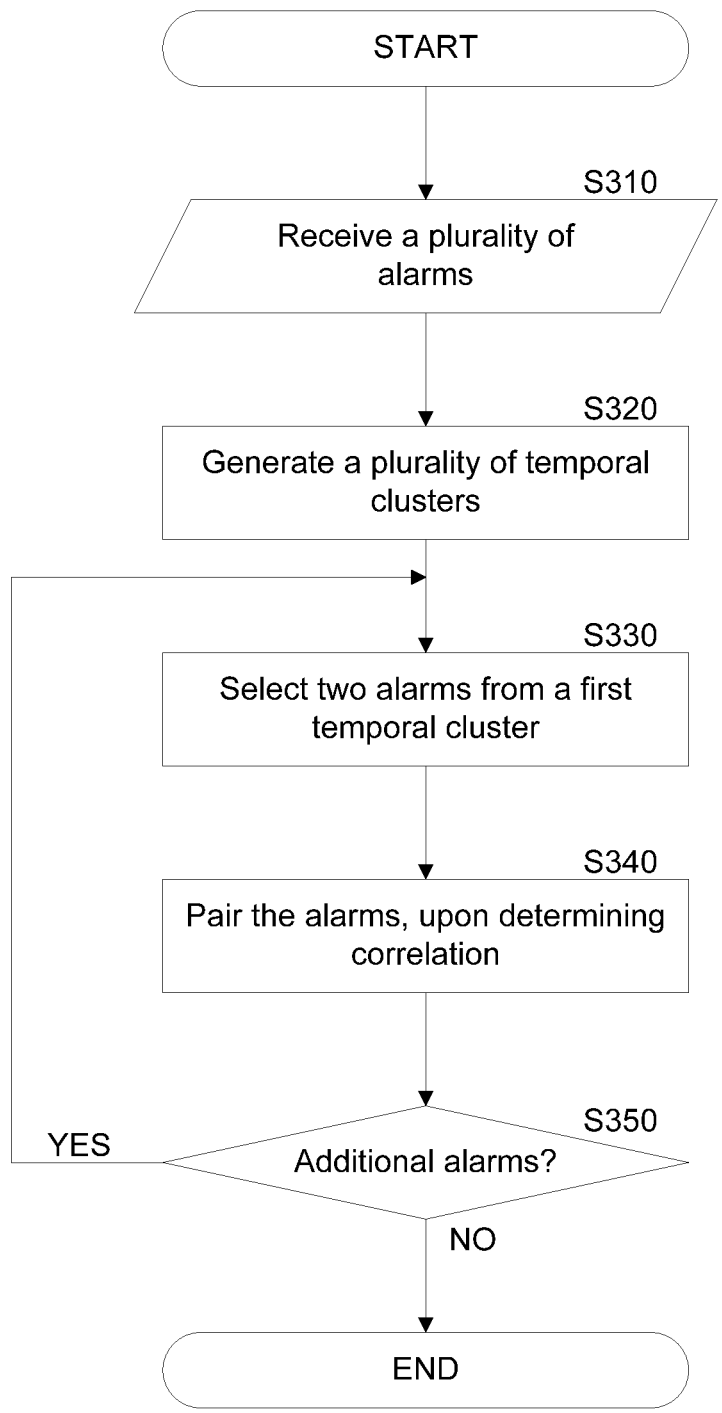
FIG. 3—is a flowchart of a method for correlating alarms, implemented in accordance with an embodiment.

FIG. 3 is a non-limiting exemplary flowchart of a method for correlating alarms, implemented in accordance with an embodiment. In S310 a plurality of alarms are received by the FaM system 100. At least one alarm of the plurality of alarms is respective of, or related to, a first NE, and at least another alarm of the plurality of alarms is respective of, or related to, a second NE. An alarm may include any of, e.g., but not limited to, any of: an identifier of the NE, an alarm type, an alarm name, a timestamp, and/or the like. In some example embodiments, the alarms may be respective of, or related to, a managed object, which may include, e.g., but not limited to, a physical NE, logical NE, and/or combinations thereof. In S320 the plurality of alarms can be temporally clustered into discrete time units. For example, in one exemplary embodiment, clusters may be one minute long intervals, so that any alarms received within a one minute interval, are clustered together. In some embodiments, the length of the time unit may be adjustable manually. Clustering may be, in an embodiment, associating an alarm with a temporal cluster identifier. In S330, in one exemplary embodiment, at least a first alarm and second alarm are selected from a first temporal cluster. The FaM System 100, according to an exemplary embodiment, is configured to determine if there is a correlation between the first and second alarms. An exemplary method for correlating alarms is discussed in further detail in FIG. 4. In certain embodiments, a plurality of alarms may be correlated. Correlation may be respective of, or related to, a probability function. In S340, according to an exemplary embodiment, the alarms are tagged as correlated, upon determination that the probability of correlation exceeds a predetermined threshold. In S350, according to an exemplary embodiment, a check is performed to determine if additional alarms should be selected. If 'yes' execution continues, according to an exemplary embodiment, at S330, otherwise, execution terminates, according to an exemplary embodiment.

In some embodiments, the system may correlate alarms in more than one modes, according to an exemplary embodiment. In one exemplary mode, the system may select a past time frame containing therein a plurality of temporal clusters of any given size at any given moment, and determine correlation from there. If, for example, not enough correlations are determined, the system, according to an exemplary embodiment, may enlarge the time frame. In another exemplary mode, the time frame is of constant or dynamic size, but is constantly updated as time moves forward, according to an exemplary embodiment. In yet another exemplary mode, the system may initiate correlation at predetermined times, which may be static, dynamic, and/or combinations thereof, according to an exemplary embodiment. For example, during peak times correlation may be performed every 1 hour, and/or during off-peak, correlation is performed for every 5,000 alarms received, according to an exemplary embodiment.

Correlating alarms, according to an exemplary embodiment, is a step in determining a root cause of the alarms. The root cause of one or more alarms is the alarm whose event has triggered the subsequent correlated alarms. Once alarms are correlated, when a root cause alarm is subsequently identified, according to an exemplary embodiment, the FaM system may alert a user to the root cause, eliminating the need for the user to manually determine the root cause, and allowing for an overall faster response time to fixing errors within the network.

Figure 4:
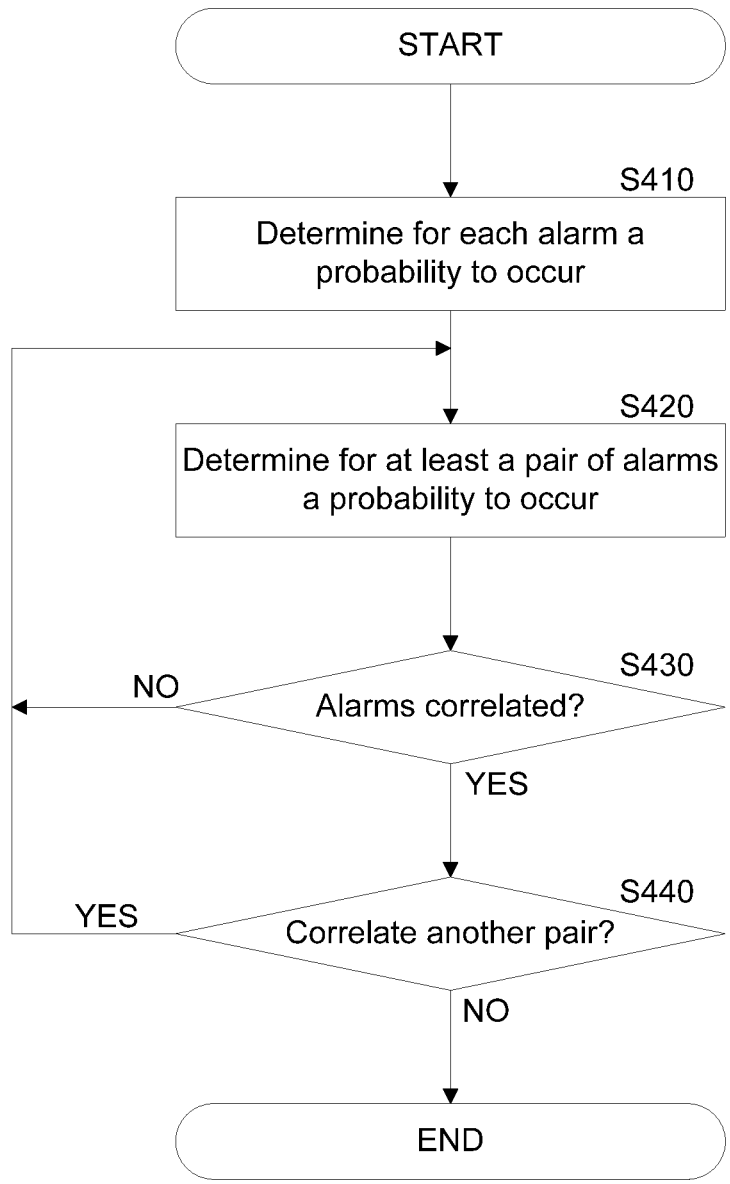
FIG. 4—is a flowchart for determining a probability alarms are correlated, implemented in accordance with an embodiment.

FIG. 4 is a non-limiting exemplary flowchart for determining a probability alarms are correlated, implemented in accordance with an embodiment. In S410, according to an exemplary embodiment, a probability is determined for each alarm to occur. For example, a probability to occur may be determined by counting the number of times an alarm occurs, and dividing that number by the number of discrete time units. In S420, according to an exemplary embodiment, a probability is determined for a first alarm and a second alarm to occur together. The probability may be determined based on the probability of each alarm to occur, according to an exemplary embodiment. In some embodiments, a probability may be determined for a plurality of alarms to occur together. In S430, according to an exemplary embodiment, a check is performed to determine if the first alarm and second alarm are correlated. Alarms may be considered correlated if, for example, the probability for the first alarm and second alarm to occur together exceeds a first threshold, according to an exemplary embodiment. In some embodiments, the threshold may be determined based on the number of times an alarm occurs, e.g. the number exceeds a second threshold, according to an exemplary embodiment. If the alarms are correlated execution can continue at S440, otherwise execution can continue at S420, according to an exemplary embodiment. In S440, according to an exemplary embodiment, a check is performed to determine if additional alarms should be correlated. If 'yes' execution continues at S420, otherwise execution terminates, according to an exemplary embodiment.

Figure 5:
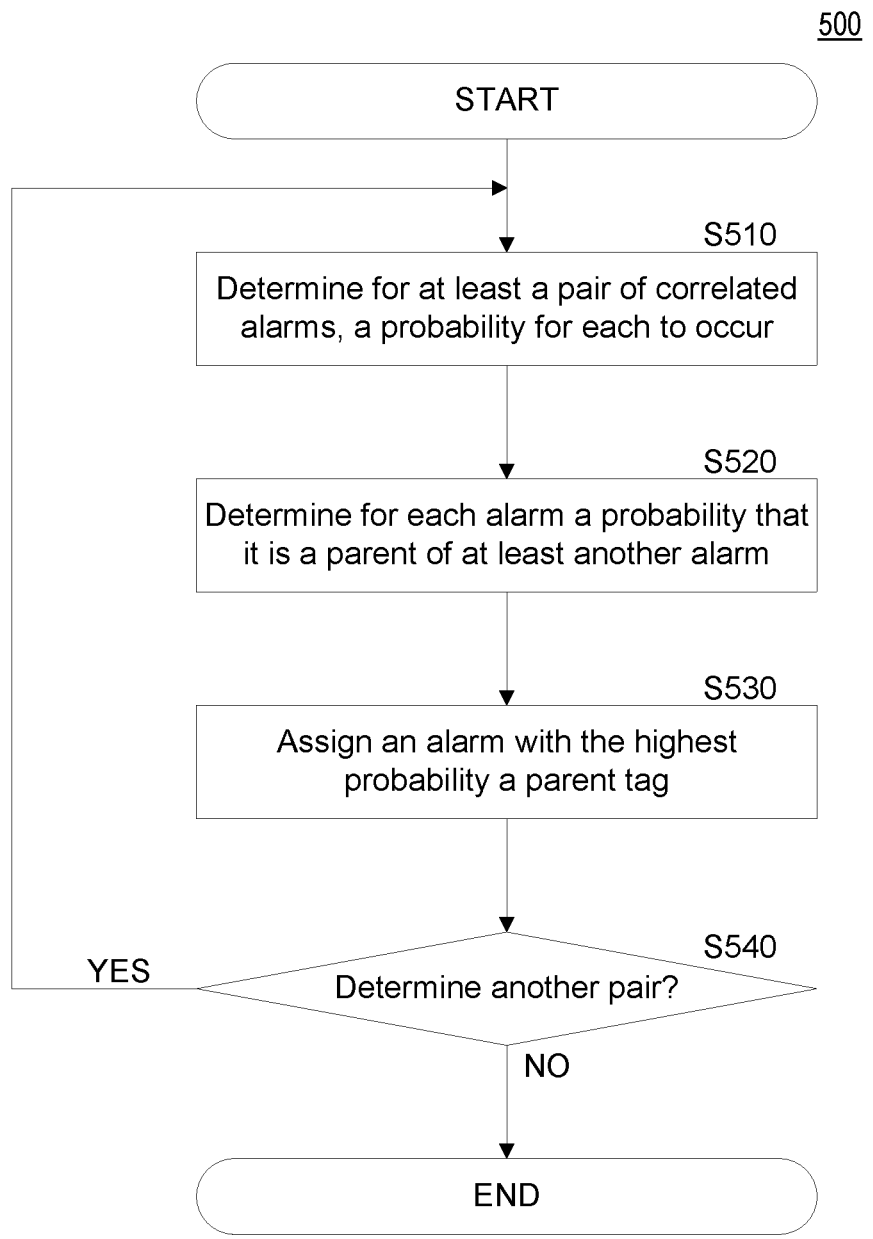
FIG. 5—is a flowchart for determining a probability that a first alarm is a cause of a second alarm, implemented in accordance with an embodiment.

FIG. 5 is a non-limiting exemplary flowchart for determining a probability that a first alarm is a cause of a second alarm, implemented in accordance with an embodiment. A first alarm may be considered a parent of a second alarm if, for example, the parent alarm reports the root cause which causes further alarms to trigger, according to an exemplary embodiment. For example, in an LTE cellular network, a first eNodeB and a second eNodeB communicate over an Ethernet port over the X2 protocol, according to an exemplary embodiment. In this example, the FaM System 100 receives the following alarms: a first alarm indicating that the Ethernet port for the first eNodeB is down, a second alarm indicating the X2 interface of the first eNodeB is down, and a third alarm indicating the X2 interface of the second eNodeB is down, according to an exemplary embodiment. In this example, according to an exemplary embodiment, the first alarm is the root cause of the second alarm and the third alarm. In S510, according to an exemplary embodiment, a probability of the alarm type to occur is determined for at least each of a pair of correlated alarms. In certain embodiments, probabilities may be determined for a plurality of alarms, according to an exemplary embodiment. In S520, according to an exemplary embodiment, a probability is determined for each alarm to be the parent alarm. Determination is respective of, or related to, the probability of the alarm type to occur, according to an exemplary embodiment. In S530, according to an exemplary embodiment, an alarm with the highest probability to be the parent is assigned to be the parent alarm. In some embodiments, a confidence interval may be further calculated and assigned to the parent alarm. In S540, according to an exemplary embodiment, a check is performed to determine if a parent should be determined for at least another pair of alarms. If 'yes' execution continues at S510, otherwise execution terminates, according to an exemplary embodiment.

In an exemplary embodiment, the FaM system 100, according to an exemplary embodiment, may be configured to assume that every child has one parent. While this assumption is not necessarily correct, it may be advantageous to allow generation of a solvable model, according to an exemplary embodiment.

In some embodiments, the FaM System 100 may report to a user only a parent alarm. In such embodiments, a user may benefit from receiving fewer notifications. For example, this may lead to faster response time, as solving a root cause has the potential to solve a plurality of problems which various alarms may be reporting, according to an exemplary embodiment.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as, e.g., but not limited to, one or more central processing units ("CPUs"), a memory, and/or input/output interfaces, etc. The computer platform may also include, e.g., but not limited to, an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as, e.g., but not limited to, an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for configuring a fault management (FaM) system coupled with a telecommunication network, for detecting malfunctions in the telecommunication network, the method comprising:
　receiving, by at least one processor, over the telecommunication network a plurality of alarms, each alarm comprising: a network element (NE) identifier of an NE of the telecommunication network, an alarm name, and a timestamp;
　generating, by the at least one processor, a plurality of temporal clusters, each temporal cluster associated with one or more alarms of the plurality of alarms;
　determining, by the at least one processor, a first probability that a first alarm of a first temporal cluster, and a second alarm of the first temporal cluster, are correlated;
　determining, by the at least one processor, a causality between the first alarm and the second alarm, upon determination that the first probability exceeds a first threshold,
　　wherein said determining the causality further comprises:
　　　determining, by the at least one processor, a probability that the first alarm is a parent of the second alarm; and
　displaying, by the at least one processor, only the parent alarm to a user of the FaM System.

2. The computerized method of claim 1, wherein each temporal cluster is of an equal length of time.

3. The computerized method of claim 1, wherein determining the first probability further comprises:
　determining, by the at least one processor, a second probability: of a first alarm type of the first alarm to occur; and
　determining, by the at least one processor, a third probability: of a second alarm type of the second alarm to occur.

4. The computerized method of claim 3, further comprising:
　determining, by the at least one processor, a number of times the first alarm type and the second alarm type occur together.

5. The computerized method of claim 1, wherein the number of occurrences of the first alarm type exceed the number of occurrences of the second alarm type.

6. The computerized method of claim 1, further comprising:
displaying, by the at least one processor, one or more child alarms associated with the parent alarm, upon receiving an instruction from a user device of the FaM System.

7. The computerized method of claim 1, wherein an NE is at least one of: a physical component, a logical component, or a combination thereof.

8. The computerized method of claim 1, wherein associating an alarm with a temporal cluster is performed respective of, or related to, the alarm timestamp.

9. The computerized method of claim 1, wherein the NE identifier is associated with a managed object.

10. The method according to claim 1, wherein the method further comprises at least two or more of:
wherein each temporal cluster is of an equal length of time;
wherein determining the first probability further comprises at least one or more of:
determining a second probability: of a first alarm type of the first alarm to occur;
determining a third probability: of a second alarm type of the second alarm to occur; or
determining a number of times the first alarm type and the second alarm type occur together;
wherein the number of occurrences of the first alarm type exceed the number of occurrences of the second alarm type;
displaying one or more child alarms associated with the parent alarm, upon receiving an instruction from a user device of the FaM System;
wherein an NE is at least one or more of:
a physical component,
a logical component, or
a combination thereof;
wherein associating an alarm with a temporal cluster is performed respective of, or related to, the alarm timestamp; or
wherein the NE identifier is associated with a managed object.

11. The method according to claim 1, wherein the method further comprises:
wherein each temporal cluster is of an equal length of time;
wherein determining the first probability further comprises at least one or more of:
determining a second probability: of a first alarm type of the first alarm to occur;
determining a third probability: of a second alarm type of the second alarm to occur; or
determining a number of times the first alarm type and the second alarm type occur together;
wherein the number of occurrences of the first alarm type exceed the number of occurrences of the second alarm type;
displaying one or more child alarms associated with the parent alarm, upon receiving an instruction from a user device of the FaM System;
wherein an NE is at least one or more of:
a physical component,
a logical component, or
a combination thereof;
wherein associating an alarm with a temporal cluster is performed respective of, or related to, the alarm timestamp; and
wherein the NE identifier is associated with a managed object.

12. The method according to claim 1, further comprising:
wherein said telecommunications network comprises a wireless telecommunications network;
wherein said wireless telecommunications network comprises an LTE cellular network, and a first eNodeB and a second eNodeB communicate over an Ethernet network interface port over an X2 protocol;
wherein the first alarm indicating that the Ethernet port for the first eNodeB is down;
wherein the second alarm indicating the X2 interface of the first eNodeB is down, and the third alarm indicating the X2 interface of the second eNodeB is down; and
wherein the first alarm is the root cause of the second alarm and the third alarm; and
wherein by reporting to a user only the parent alarm, the user receives a benefit from receiving fewer notifications, providing faster response time, and solving the root cause.

13. A system comprising:
a fault management FaM system comprising at least one processor, and at least one memory coupled to the at least one processor, wherein said fault management FaM system coupled with a telecommunication network, said fault management FaM system configured to:
detect malfunctions in the telecommunication network wherein said fault management FaM system is configured to:
receive over the telecommunication network a plurality of alarms, each alarm comprising:
a network element (NE) identifier of an NE of the telecommunication network,
an alarm name, and
a timestamp;
generate a plurality of temporal clusters, each temporal cluster associated with one or more alarms of the plurality of alarms;
determine a first probability that a first alarm of a first temporal cluster, and a second alarm of the first temporal cluster, are correlated;
determine a causality between the first alarm and the second alarm, upon determination that the first probability exceeds a first threshold,
wherein said determine the causality further comprises:
determine a probability that the first alarm is a parent of the second alarm; and
display only the parent alarm to a user of the FaM System.

14. The system according to claim 13, wherein the system is configured to further comprise at least one or more of:
wherein each temporal cluster is of an equal length of time;
wherein said determine the first probability further comprises the system configured to at least one or more of:
determine a second probability: of a first alarm type of the first alarm to occur;
determine a third probability: of a second alarm type of the second alarm to occur; or
determine a number of times the first alarm type and the second alarm type occur together;
wherein the number of occurrences of the first alarm type exceed the number of occurrences of the second alarm type;

comprises the system is configured to display one or more child alarms associated with the parent alarm, upon receipt of an instruction from a user device of the FaM System;

wherein an NE is at least one or more of:
- a physical component,
- a logical component, or
- a combination thereof;

wherein the system configured to associate an alarm with a temporal cluster is performed respective of, or related to, the alarm timestamp; or wherein the NE identifier is associated with a managed object.

15. The system according to claim 13, wherein the system is configured to further comprise:

wherein each temporal cluster is of an equal length of time;

wherein said determine the first probability further comprises the system configured to at least one or more of:
- determine a second probability: of a first alarm type of the first alarm to occur;
- determine a third probability: of a second alarm type of the second alarm to occur; or
- determine a number of times the first alarm type and the second alarm type occur together;

wherein the number of occurrences of the first alarm type exceed the number of occurrences of the second alarm type;

comprises the system is configured to display one or more child alarms associated with the parent alarm, upon receipt of an instruction from a user device of the FaM System;

wherein an NE is at least one or more of:
- a physical component,
- a logical component, or
- a combination thereof;

wherein the system configured to associate an alarm with a temporal cluster is performed respective of, or related to, the alarm timestamp; and wherein the NE identifier is associated with a managed object.

16. A computer program product embodied on a nontransitory computer accessible storage medium, which when executed on at least one processor performs a method of configuring a fault management FaM system coupled with a telecommunication network, wherein the method comprises configuring the fault management FaM system for detecting malfunctions in the telecommunication network, the method comprising:

receiving over the telecommunication network a plurality of alarms, each alarm comprising: a network element (NE) identifier of an NE of the telecommunication network, an alarm name, and a timestamp;

generating a plurality of temporal clusters, each temporal cluster associated with one or more alarms of the plurality of alarms;

determining a first probability that a first alarm of a first temporal cluster, and a second alarm of the first temporal cluster, are correlated;

determining a causality between the first alarm and the second alarm, upon determination that the first probability exceeds a first threshold,
wherein said determining the causality further comprises:
determining a probability that the first alarm is a parent of the second alarm; and displaying only the parent alarm to a user of the FaM System.

17. The computer program product according to claim 16, wherein the method further comprises:

wherein each temporal cluster is of an equal length of time;

wherein determining the first probability further comprises at least one or more of:
- determining a second probability: of a first alarm type of the first alarm to occur;
- determining a third probability: of a second alarm type of the second alarm to occur; or
- determining a number of times the first alarm type and the second alarm type occur together;

wherein the number of occurrences of the first alarm type exceed the number of occurrences of the second alarm type;

displaying one or more child alarms associated with the parent alarm, upon receiving an instruction from a user device of the FaM System;

wherein an NE is at least one or more of:
- a physical component,
- a logical component, or
- a combination thereof;

wherein associating an alarm with a temporal cluster is performed respective of, or related to, the alarm timestamp; and wherein the NE identifier is associated with a managed object.

18. The system according to claim 13, wherein the system is configured to further comprise:

wherein said telecommunications network comprises a wireless telecommunications network;

wherein said wireless telecommunications network comprises an LTE cellular network, and a first eNodeB and a second eNodeB communicate over an Ethernet network interface port over an X2 protocol;

wherein the first alarm indicating that the Ethernet port for the first eNodeB is down;

wherein the second alarm indicating the X2 interface of the first eNodeB is down, and the third alarm indicating the X2 interface of the second eNodeB is down; and wherein the first alarm is the root cause of the second alarm and the third alarm; and wherein by reporting to a user only the parent alarm, the user receives a benefit from receiving fewer notifications, providing faster response time, and solving the root cause.

19. The computer program product according to claim 16, wherein the method further comprises at least one or more of:

wherein each temporal cluster is of an equal length of time;

wherein determining the first probability further comprises at least one or more of:
- determining a second probability: of a first alarm type of the first alarm to occur;
- determining a third probability: of a second alarm type of the second alarm to occur; or
- determining a number of times the first alarm type and the second alarm type occur together;

wherein the number of occurrences of the first alarm type exceed the number of occurrences of the second alarm type;

displaying one or more child alarms associated with the parent alarm, upon receiving an instruction from a user device of the FaM System;

wherein an NE is at least one or more of:
a physical component,
a logical component, or
a combination thereof;
wherein associating an alarm with a temporal cluster is performed respective of, or related to, the alarm timestamp; or
wherein the NE identifier is associated with a managed object.

20. The computer program product according to claim 16, wherein the method further comprises:
wherein said telecommunications network comprises a wireless telecommunications network;
wherein said wireless telecommunications network comprises an LTE cellular network, and a first eNodeB and a second eNodeB communicate over an Ethernet network interface port over an X2 protocol;
wherein the first alarm indicating that the Ethernet port for the first eNodeB is down;
wherein the second alarm indicating the X2 interface of the first eNodeB is down, and the third alarm indicating the X2 interface of the second eNodeB is down; and
wherein the first alarm is the root cause of the second alarm and the third alarm; and
wherein by reporting to a user only the parent alarm, the user receives a benefit from receiving fewer notifications, providing faster response time, and solving the root cause.

* * * * *